(12) United States Patent
Motohashi

(10) Patent No.: US 7,319,825 B2
(45) Date of Patent: Jan. 15, 2008

(54) IMAGE FORMING APPARATUS INCLUDING FUNCTION FOR PROVIDING STATUS INFORMATION BY ELECTRONIC MAIL

(75) Inventor: Hiroomi Motohashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 25 days.

(21) Appl. No.: 11/211,458

(22) Filed: Aug. 26, 2005

(65) Prior Publication Data

US 2006/0051105 A1   Mar. 9, 2006

(30) Foreign Application Priority Data

Sep. 3, 2004   (JP)   ............... 2004-256640

(51) Int. Cl.
*G03G 15/00*   (2006.01)
(52) U.S. Cl. .......................................... 399/8
(58) Field of Classification Search ................... 399/8
See application file for complete search history.

(56) References Cited

U.S. PATENT DOCUMENTS 6,975,419 B2 * 12/2005 Staas et al. ................. 358/1.15
6,999,191 B2 *  2/2006 Yamada et al. ................ 399/8
7,120,910 B2 * 10/2006 Matsuda et al. .............. 399/8
7,130,066 B1 * 10/2006 Kanematu ................... 399/8
2003/0117663 A1 *  6/2003 Oonuma ................... 358/1.15

FOREIGN PATENT DOCUMENTS

JP   2004-341617   12/2004

* cited by examiner

*Primary Examiner*—David M. Gray
*Assistant Examiner*—Ruth N LaBombard
(74) *Attorney, Agent, or Firm*—Oblon, Spivak, McClelland, Maier & Neustadt, P.C.

(57) ABSTRACT

An image forming apparatus communicating with an outside system via a communication part for providing image forming apparatus information to the outside system is disclosed. The image forming apparatus includes a memory part including the image forming apparatus information and a command data table indicating command data in correspondence with operation identification information, and a processing part configured to obtain the operation identification information included in a request electronic mail from the outside system requesting for the image forming apparatus information, extract the command data corresponding to the obtained operation identification information from the command data table in the memory part, extract the image forming apparatus information in the memory part, generate a return electronic mail including the extracted image forming apparatus information in accordance with the extracted command data, and transmit the generated return electronic mail to the outside system via the communication part.

11 Claims, 12 Drawing Sheets

FIG.4

COMMAND DATA TABLE

| OPERATION IDENTIFICATION INFORMATION | COMMAND DATA |
|---|---|
| VALUE OF MESSAGE-ID FIELD IS A VALUE OTHER THAN NULL VALUE | INCLUDE VALUE OF MESSAGE-ID FIELD OBTAINED FROM REQUEST ELECTRONIC MAIL INTO REFERENCES FIELD OF RETURN ELECTRONIC MAIL |
| MAIL ADDRESS IN REPLY-TO FIELD | SET MAIL ADDRESS OBTAINED FROM REPLY-TO FIELD OF REQUEST ELECTRONIC MAIL AS DESTINATION MAIL ADDRESS OF RETURN ELECTRONIC MAIL |
| NO MAIL ADDRESS IN REPLY-TO FIELD | SET ORIGINAL MAIL ADDRESS OBTAINED REQUEST ELECTRONIC MAIL AS DESTINATION MAIL ADDRESS OF RETURN ELECTRONIC MAIL |
| . . . | . . . |

FIG.5

DEFAULT DATA TABLE

| KIND OF PARAMETER | DEFAULT DATA |
|---|---|
| MAIL FORMAT | MAIL IN TEXT FORMAT |
| LANGUAGE OF MAIN TEXT OF MAIL | MAIN TEXT OF MAIL IN JAPANESE |
| TARGET STATUS INFORMATION | STATUS IDENTIFICATION INFORMATION = STATUS 1 |
| ... | ... |

FIG.6

| IMAGE FORMING APPARATUS INFORMATION | |
|---|---|
| STATUS IDENTIFICATION INFORMATION | STATUS INFORMATION |
| STATUS 1 | SYSTEM CONFIGURATION INFORMATION |
| STATUS 2 | NETWORK CONFIGURATION INFORMATION |
| STATUS 3 | PRINTER CONFIGURATION INFORMATION |
| STATUS 4 | SUPPLY INFORMATION |
| STATUS 5 | DEVICE STATUS INFORMATION |
| ... | ... |

FIG.8

COMMAND DATA TABLE

| OPERATION IDENTIFICATION INFORMATION | COMMAND DATA |
|---|---|
| ORIGINAL MAIL ADDRESS INCLUDED | SET ORIGINAL MAIL ADDRESS OBTAINED FROM REQUEST ELECTRONIC MAIL AS DESTINATION MAIL ADDRESS OF RETURN ELECTRONIC MAIL |
| ... | ... |

FIG.9

| COMMAND DATA TABLE | |
|---|---|
| OPERATION IDENTIFICATION INFORMATION | COMMAND DATA |
| NO DESIGNATION OF MAIL FORMAT | SET DEFAULT MAIL FORMAT AS MAIL FORMAT OF RETURN ELECTRONIC MAIL |
| NO DESIGNATION OF LANGUAGE OF MAIN TEXT OF MAIL | SET DEFAULT LANGUAGE AS MAIN TEXT OF RETURN ELECTRONIC MAIL |
| NO DESIGNATION OF TARGET STATUS INFORMATION | INCLUDE DEFAULT STATUS INFORMATION AS TARGET STATUS INFORMATION OF RETURN ELECTRONIC MAIL |
| . . . | . . . |

FIG.10

| DOMAIN LIST, MAIL ADDRESS LIST | DEFAULT DATA TABLE IDENTIFICATION |
|---|---|
| DOMAIN 1, DOMAIN 2, MAIL ADDRESS 1 MAIL ADDRESS 2, MAIL ADDRESS 3 | DEFAULT DATA TABLE 1 |
| DOMAIN 3, DOMAIN 4, DOMAIN 5 MAIL ADDRESS 4 | DEFAULT DATA TABLE 2 |
| MAIL ADDRESS 5 | DEFAULT DATA TABLE 3 |
| ... | ... |

FIG.11

| DOMAIN LIST, MAIL ADDRESS LIST | STATUS IDENTIFICATION INFORMATION |
|---|---|
| DOMAIN 1, DOMAIN 2, MAIL ADDRESS 1 MAIL ADDRESS 2, MAIL ADDRESS 3 | STATUS 1, STATUS 2 |
| DOMAIN 3, DOMAIN 4, DOMAIN 5 MAIL ADDRESS 4 | STATUS 3, STATUS 4 |
| MAIL ADDRESS 5 | STATUS 5 |
| ... | ... |

FIG.12A

| EXAMPLE OF SUBJECT FIELD | WHAT OPERATION IS REQUESTED |
|---|---|
| devicestatus?<br>request = sysconfig&<br>format = text&lang = en | REQUESTING FOR SYSTEM CONFIGURATION INFORMATION STORED IN IMAGE FORMING APPARATUS IN AN ENGLISH TEXT FORMAT |

FIG.12B

| ARGUMENT NAME | MEANING OF ARGUMENT NAME | EXAMPLES OF PARAMETERS CORRESPONDING TO ARGUMENTS |
|---|---|---|
| request | REQUESTED INFORMATION | sysconfig, netconfig, prtconfig, supply, status ... |
| format | MAIL FORMAT | text, html, xml ... |
| lang | LANGUAGE OF MAIN TEXT OF MAIL | ja, en, fr, de, it, es ... |

IMAGE FORMING APPARATUS INCLUDING FUNCTION FOR PROVIDING STATUS INFORMATION BY ELECTRONIC MAIL

BACKGROUND OF THE INVENTION

1. Field of the Invention

The present invention relates to an image forming apparatus, and more particularly to an image forming apparatus having a function for providing information regarding the image forming apparatus by electronic mail.

2. Description of the Related Art

Conventionally, in order to check the state of image forming apparatuses installed at the offices of customers, there is a method of having a maintenance person patrol and inspect the image forming apparatuses installed at each of the offices by foot. In the inspection, the maintenance person obtains/confirms information of each image forming apparatus (image forming apparatus information) such as information of malfunctioned areas, status information, and information of various settings. Thus, the maintenance person fixes the malfunctioned area when an abnormality is found.

Other than inspecting the image forming apparatuses by foot, information may alternatively be obtained by a method of installing Web server software for HTTP communication in the image forming apparatus and conducting HTTP communication with a remote management computer using WEB browser software. With this method, the image forming apparatus transmits HTML data including image forming apparatus information to the remote management computer via a communication line. This allows the remote management computer to understand the state of each of the image forming apparatuses installed at the offices of the customers.

With the conventional method, however, there is a problem when an image forming apparatus is located in an inside network (e.g. LAN) having a firewall for restricting access from an outside network (e.g. the Internet). The firewall is often set to prevent request packets of HTTP from entering a computer in the inside network from an outside network such as the Internet. This is a security measure for prevent inside information from leaking to the outside. Accordingly, the conventional method is unable to conduct HTTP communication from an outside network, such as the Internet when an image forming apparatus is located in an inside network (e.g. LAN) having a firewall situated between the inside network and the outside network.

Furthermore, in the case of communicating with HTTP protocol, it is difficult to prevent unauthorized computers from accessing the image forming apparatus once the IP address of the image forming apparatus becomes known.

SUMMARY OF THE INVENTION

It is a general object of the present invention to provide an image forming apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an image forming apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image forming apparatus communicating with an outside system via a communication part for providing image forming apparatus information to the outside system, the image forming apparatus including: a memory part including the image forming apparatus information and a command data table indicating command data in correspondence with operation identification information; and a processing part configured to obtain the operation identification information included in a request electronic mail from the outside system requesting for the image forming apparatus information, extract the command data corresponding to the obtained operation identification information from the command data table in the memory part, extract the image forming apparatus information in the memory part, generate a return electronic mail including the extracted image forming apparatus information in accordance with the extracted command data, and transmit the generated return electronic mail to the outside system via the communication part.

Other objects and further features of the present invention will be apparent from the following detailed description when read in conjunction with the accompanying drawings.

BRIEF DESCRIPTION OF THE DRAWINGS

FIG. 4 is a schematic view showing a data structure of a command data table according to an embodiment of the present invention;

FIG. 5 is a schematic view showing a data structure of a default data table according to an embodiment of the present invention;

FIG. 6 is a schematic view showing a data structure of image forming apparatus information according to an embodiment of the present invention;

FIG. 8 is a schematic view showing a data structure of another command data table according to an embodiment of the present invention;

FIG. 9 is a schematic view showing a data structure of yet another command data table according to an embodiment of the present invention;

FIG. 10 is a schematic view showing a data structure of a domain list and a mail address list according to an embodiment of the present invention;

FIG. 11 is a schematic view showing a data structure of yet another domain list and a mail address list according to an embodiment of the present invention; and FIGS. 12A and 12B are tables showing examples of a description in a Subject field of a request electronic mail.

DESCRIPTION OF THE PREFERRED EMBODIMENTS

In the following, embodiments of the present invention will be described with reference to the accompanying drawings.

Figure 1:
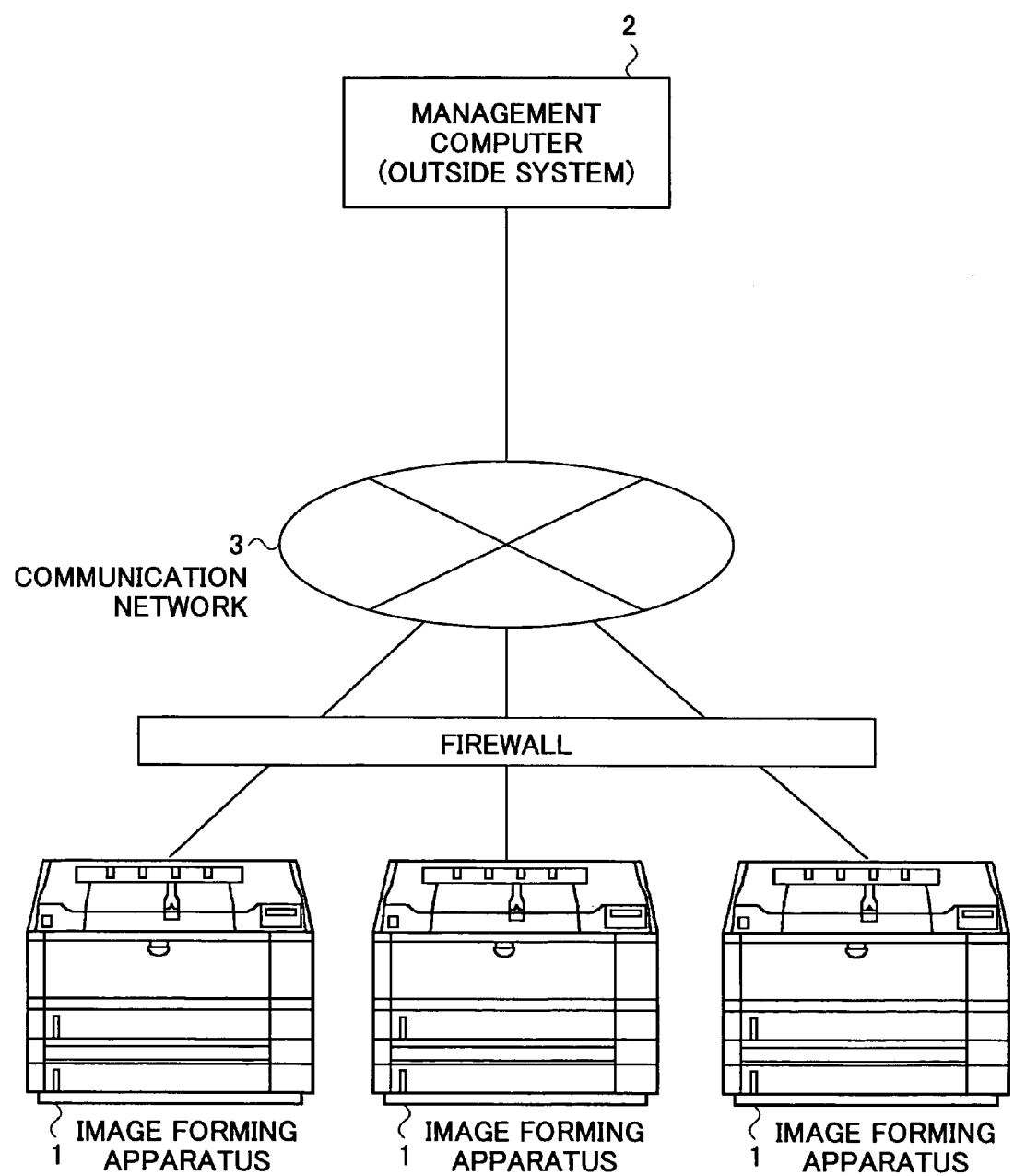
FIG. 1 is a schematic view showing an overall configuration of a system including image forming apparatuses according to an embodiment of the present invention.

(1) FIG. 1 is a drawing showing an overall configuration of a system including an image forming apparatus 1 according to an embodiment of the present invention. As shown in the drawing, the image forming apparatus 1 is connected to a management computer (outside system) 2 situated at a remote location via a communication network 3. The image forming apparatus 1 may be, for example, a printer, a digital copier, or a multi-function apparatus. The management computer 2 may be, for example, a server for managing the image forming apparatus 1. The communication network 3 may be, for example, various communication lines (communication system), such as the Internet, telephone lines, wireless communication lines, and a frame relay system.

A firewall 4 is provided between the communication network 3 (outside network) and an inside network (e.g. LAN) where the image forming apparatus 1 is located. The firewall 4 is a software or hardware for controlling packet data delivered from the outside network to the inside network and/or the packet data delivered from the inside network to the outside network. The firewall 4 in this example controls the packet data according to HTTP communication (HTTP packets) delivered from the communication network (outside network) 3 to the image forming apparatus 1 situated in the inside network (e.g. LAN). This is to prevent information in the inside network from leaking to the outside.

However, the firewall 4 does not control packets of electronic mail (E-mail packets) regardless of whether they are delivered from the communication network 3 to the inside network or from the inside network to the communication network 3. This is to achieve the fundamental purpose of electronic mail where packets are to be sent in both directions. In this example, both the image forming apparatus 1 and the management computer 2 have a function of sending/receiving electronic mail by having predetermined mailer software installed in its memory apparatus (HDD).

Next, an exemplary configuration of the image forming apparatus 1 is described with reference to FIG. 2.

Figure 2:
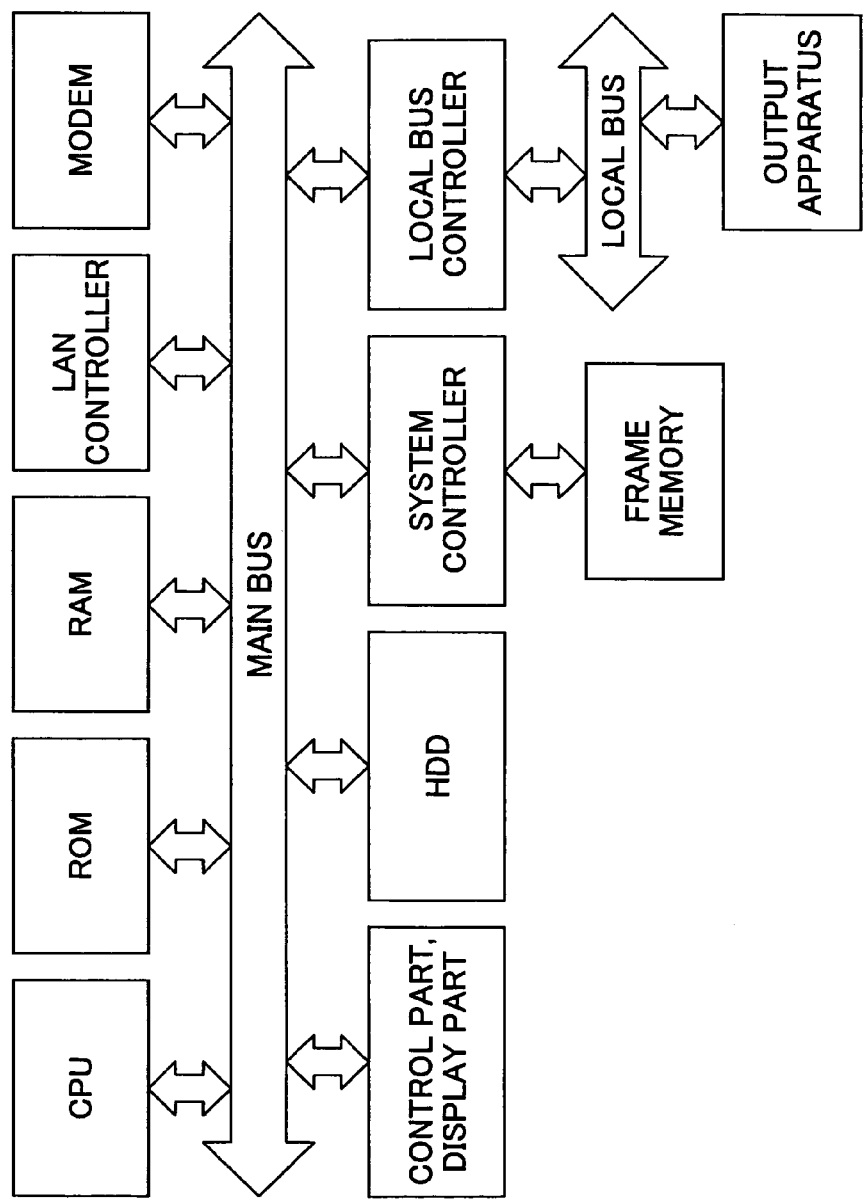
FIG. 2 is a schematic view showing a configuration of an image forming apparatus according to an embodiment of the present invention.

(2) As shown in FIG. 2, the image forming apparatus 1 includes a ROM, a RAM, a HDD, a frame memory which respectively serve as a memory part, a modem which serves as a communication part, and a CPU which serves as a processing part for controlling the aforementioned parts. The image forming apparatus 1 also includes various controllers which serve as an interface apparatus for controlling various software and hardware, a display part which displays information, a control part which receive commands from the user, and an output apparatus for outputting (e.g. printing out) data. The aforementioned parts of the image forming apparatus 1 are connected by a main bus or a local bus and cooperate with each other by communicating with signals. Although not shown in FIG. 2, the image forming apparatus 1 may also include a scanner serving as an input apparatus for reading in image data or another image forming mechanism.

Figure 3:
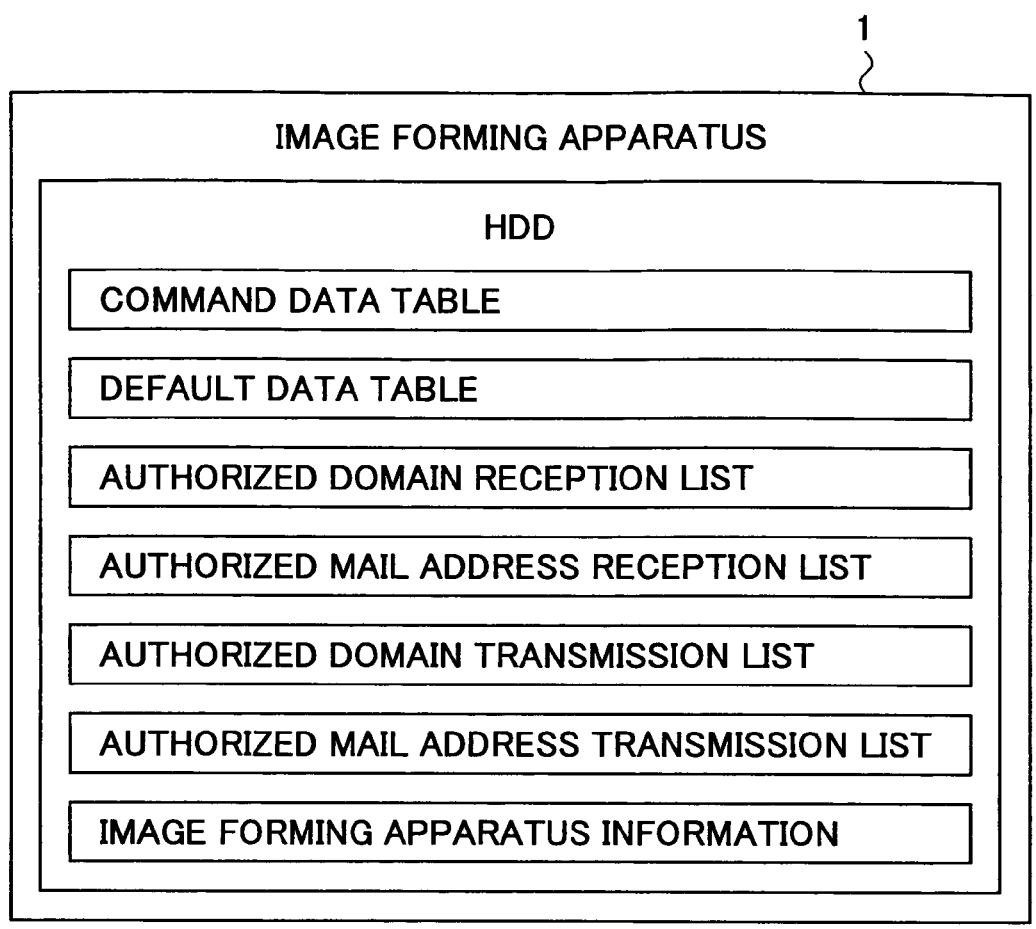
FIG. 3 is a schematic view showing various information stored in a HDD of an image forming apparatus according to an embodiment of the present invention.

The display part of the image forming apparatus 1 may be, for example, a liquid crystal display. The output apparatus of the image forming apparatus 1 may be, for example, various printer apparatuses such as an inkjet type printer or a laser type printer. The control part of the image forming apparatus 1 may be, for example, a touch panel or a control button(s). As shown in FIG. 3, the HDD serving as one of the memory parts of the image forming apparatus 1 includes a command data table, a default data table, an authorized domain reception list, an authorized mail address reception list, an authorized domain transmission list, an authorized mail address transmission list, and image forming apparatus information. The HDD serving as one of the memory parts of the image forming apparatus 1 is stored with various computer programs for enabling the CPU (i.e. processing part, computer) to perform various operations.

The image forming apparatus 1 operates by having the CPU (i.e. processing part, computer) interpret and execute the various computer programs stored in the HDD. In a case where the control part (i.e. input part) receives a command input by the user, the CPU (i.e. processing part) interprets and executes the command. In a case of outputting information from the image forming apparatus 1, the CPU (i.e. processing part) allows the display part to display the information or the output apparatus to print out the information. In a case of performing communication between the image forming apparatus 1 and the management computer 2, the CPU (i.e. processing part) allows information to be transmitted/received via the modem (i.e. communication part) and the communication network 2.

Next, the data structures of the command data table and the default data table which are stored in the HDD (i.e. memory part) are described with reference to FIGS. 4 and 5.

(3) FIG. 4 shows an exemplary data structure of the command data table. The command data table has a data structure in which command data is stored in correspondence with operation identification information. In this example, the term "command data" refers to data for allowing the CPU of the image forming apparatus 1 to perform a predetermined operation in generating a return electronic mail in response to a request electronic mail transmitted from the management computer (outside system) 2. The request electronic mail is an electronic mail requesting for information regarding the image forming apparatus 1 (i.e. image forming apparatus information). One example of the predetermined operation is to obtain the value in a Message-ID field of a request electronic mail and include the obtained value in a References field of the return electronic mail. Another example of the predetermined operation is to obtain the original address of the request electronic mail and set the obtained original address as the destination address of the return electronic mail.

In this example, the term "operation identification information" is information for identifying (distinguishing) a command data used for enabling the CPU of the image forming apparatus 1 to conduct a predetermined operation in generating the return electronic mail. In a case where a predetermined operation identification information is included in the request electronic mail, the return electronic mail is generated in accordance with the command data corresponding to the predetermined operation identification information. One example of the predetermined operation identification information is Message-ID field information indicating that there is a value in the Message-ID field of the request electronic mail (i.e. information indicating that the value in the Message-ID field of the request electronic mail is a value other than a Null value). As another example of the predetermined operation identification information is information indicating that there is a return mail address included in a Reply-To field of the request electronic mail (i.e.

information indicating that the value in the Reply-To field of the request electronic mail is a value other than a Null value). Accordingly, with the command data table, command data for allowing the CPU to perform predetermined operations can be identified by identifying the corresponding operation identification information.

The instruction data table is stored and set in the HDD of the image forming apparatus 1 beforehand by the user (manager) of the image forming apparatus 1. First, the manager of the image forming apparatus 1 prepares the command data table by using (operating) the control part of the image forming apparatus 1 and commands that the command data table be recorded (registered) in the image forming apparatus 1. Then, when the CPU of the image forming apparatus 1 receives the command, the CPU stores the command data table in the HDD (memory part).

Furthermore, the manager of the image forming apparatus 1 may also command that the command data table be recorded in the image forming apparatus 1 by using the management computer 2 for managing the image forming apparatus 1. Accordingly, when the command for recording the command data table is received by the modem of the image forming apparatus 1 via the communication network 3, the CPU stores the received command data table in the HDD. Thereby, the command data table is stored in the HDD (memory part) of the image forming apparatus 1. In the same manner as the recording process, the manager of the image forming apparatus 1 may edit/delete data in the command data table by using the control part of the image forming apparatus 1 or the management computer 2 managing the image forming apparatus 1.

(4) FIG. 5 shows an exemplary data structure of the default data table. As shown in FIG. 5, the default data table has a data structure in which default data is stored in correspondence with various kinds of parameters of electronic mail.

The various kinds of parameters of the electronic mail include, for example, a parameter corresponding to the form of data of the electronic mail (e.g. text form, html form, xml form), or a parameter corresponding to the language of the main text of the electronic mail (e.g. English, Japanese). The operation identification information in the request electronic mail includes parameter information indicating that the request electronic mail includes no designation of a predetermined parameter of the return electronic mail. One example of the designation of the predetermined parameter of the return electronic mail is to designate setting the mail format of the return electronic mail to HTML format. Another example of the designation of the predetermined parameter of the return electronic mail is to designate setting the language of the main text of the return electronic mail to Japanese. Accordingly, with the default data table, default data for the return electronic mail can be identified by identifying the corresponding kind of parameter of the electronic mail.

The default data table is also stored and set in the HDD of the image forming apparatus 1 beforehand by the user (manager) of the image forming apparatus 1. The method (process) of storing the default data table in the HDD and the manner of editing/deleting the data in the default data table are the same as those of the above-described command data table.

(5) Next, the lists stored in the HDD (memory part) including the authorized domain reception list, the authorized mail address reception list, the authorized domain transmission list, and the authorized mail address are described.

Both the authorized domain reception list and the authorized domain transmission list include multiple domains (the part of an electronic mail address following the @ mark) of electronic mail. The authorized domain reception list is used for determining whether the request electronic mail is authentic based on the domain indicated as the original mail address of the request electronic mail. On the other hand, the authorized domain transmission list is used for determining whether the destination of the return electronic mail is authentic based on the domain indicated on the destination of the return electronic mail.

The authorized mail address reception list and the authorized mail address transmission list include multiple mail addresses (user name @ domain name) of electronic mail. The authorized mail address reception list is used for determining whether the request electronic mail is authentic based on the mail address indicated on the original mail address of the request electronic mail. On the other hand, the authorized mail address transmission list is used for determining whether the destination of the return electronic mail is authentic based on the mail address indicated on the destination mail address of the return electronic mail.

The authorized domain reception list, the authorized mail address reception list, the authorized domain transmission list, and the authorized mail address transmission list are all stored and set in the HDD of the image forming apparatus 1 beforehand by the manager of the image forming apparatus 1. The method (process) of storing the lists in the HDD and the manner of editing/deleting the data in the lists are the same as those of the above-described command data table.

(6) Next, the data structure of the image forming apparatus information (i.e. information regarding the image forming apparatus), which is stored in the HDD (memory part), is described with reference to FIG. 6. As shown in FIG. 6, the image forming apparatus information has a data structure in which status identification information for identifying status information is associated to corresponding status information. The "status information" includes, for example, system configuration information, network configuration information, printer configuration information, supply information, and device status information. Accordingly, with the image forming apparatus information, prescribed status information can be identified by identifying corresponding status identification information.

Among the image forming apparatus information, various setting information (e.g. configuration information such as system configuration information, network configuration information, and printer configuration information) are stored and set in the HDD of the image forming apparatus 1 beforehand by the manager of the image forming apparatus 1. Meanwhile, among the image forming apparatus information, information such as supply information and device status information are periodically checked and obtained by the CPU of the image forming apparatus. The CPU stores the obtained information in the HDD. Accordingly, the image forming apparatus information is stored in the HDD (memory part) of the image forming apparatus 1.

Figure 7:
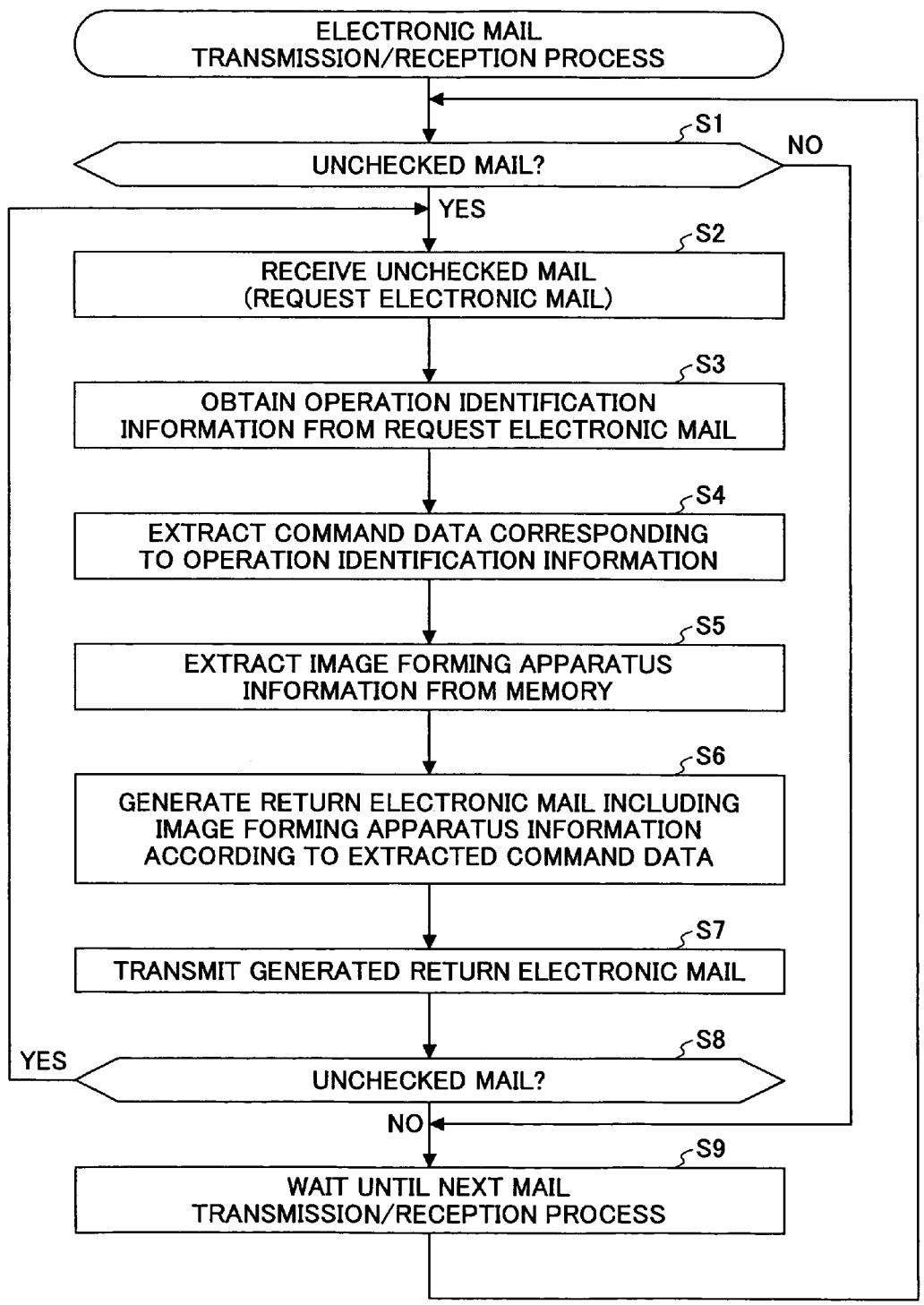
FIG. 7 is a flowchart of an electronic mail transmission/reception process according to an embodiment of the present invention.

2. The flow of the electronic mail reception/transmission process according to an embodiment of the present invention is described with reference to FIG. 7.

(1) First, the management computer 2 prepares a request electronic mail addressed to the mail address of the image forming apparatus 1 by using mailer software and transmits the request electronic mail to the image forming apparatus 1. The request electronic mail is an electronic mail which requests for information regarding the image forming apparatus 1 that is stored in the HDD of the image forming apparatus 1. The request electronic mail transmitted from the management computer 2 is relayed by a mail server located in the communication network 3. The relayed electronic mail is received at an inside mail server in an inside network located between the image forming apparatus 1 and the firewall 4.

As described above, the firewall 4 is set to allow packet data of electronic mail to pass therethrough. Therefore, in this example, the packet data of the request electronic mail is able to pass through the firewall 4.

(2) As the request electronic mail is passed through the firewall 4, the CPU of the image forming apparatus 1 queries the inside mail server, at a predetermined timing, on whether there is any unchecked electronic mail addressed to the its mail address (mail address of the image forming apparatus 1) (Step S1). In a case where the CPU of the image forming apparatus 1 receives a message indicating that there is no unchecked mail addressed to the mail address of the image forming apparatus 1, the CPU of the image forming apparatus 1 waits until the next electronic mail reception/transmission process (Step S9). The CPU of the image forming apparatus 1, after waiting until the next electronic mail reception/transmission process, repeats the operation of Step S1.

The predetermined timing for conducting Step S1 and the timing for conducting the next electronic mail reception/transmission process of Step S9 may be stored in HDD of the image forming apparatus 1 as timing data, for example. Accordingly, the Steps S1 and S9 can be conducted at the predetermined timings by referring to the timing data.

(3) In a case where there is unchecked mail addressed to the mail address of the image forming apparatus 1 (i.e. request electronic mail), the CPU of the image forming apparatus 1 receives the request electronic mail (Step S2). Then, the CPU of the image forming apparatus 1 stores the request electronic mail in its HDD.

(4) Next, the CPU of the image forming apparatus 1 obtains operation identification information from the received request electronic mail (Step S3). Then, the CPU of the image forming apparatus 1 extracts command data corresponding to the obtained operation identification information from the HDD (Step S4).

More specifically, the CPU of the image forming apparatus 1 determining the command data that is to be extracted from the command data table by judging whether operation identification information stored in the command data table of its HDD can be obtained from the request electronic mail. With reference to the exemplary command data table shown in FIG. 4, the CPU of the image forming apparatus 1 determines whether the value of the Message-ID field of the request electronic mail is a Null value. If the value of the Message-ID field is a value other than the Null value, corresponding command data is extracted from the command data table (in this example, command data in the first row of the table shown in FIG. 4). Next, the CPU of the image forming apparatus 1 judges whether there is a Reply-To Field value in the request electronic mail (whether it is a value other than a Null value). If the value in the request electronic mail is a value other than the Null value, corresponding command data is extracted from the command data table (in this example, command data in the second row of the table shown in FIG. 4). If the value in the request electronic mail is the Null value, corresponding command data is extracted from the command data table (in this example, command data in the third row of the table shown in FIG. 4).

Accordingly, the CPU of the image forming apparatus 1 extracts command data corresponding to the operation identification information in the request electronic mail from the command data table stored in the HDD.

(5) Then, the CPU of the image forming apparatus 1 extracts image forming apparatus information from the HDD (Step S5). In this step, the CPU of the image forming apparatus 1 determines whether status identification information is included in the request electronic mail. If status identification information is included in the request electronic mail, the CPU of the image forming apparatus 1 extracts the status information corresponding to the included status identification information from the image forming apparatus information stored in the HDD. In case where no status identification information is included in the request electronic mail, the CPU of the image forming apparatus 1 extracts all of the status information from the image forming apparatus information stored in the HDD.

This step is described with reference to the example of the image forming apparatus information in FIG. 6. In a case where the request electronic mail includes "Status 1" as the status identification information, the CPU of the image forming apparatus 1 extracts "system configuration information" as the corresponding the status information from the image forming apparatus information stored in the HDD. In another example, a text indicated as "request=sysconfig" may be defined in the image forming apparatus information so that "request=sysconfig" serves as status identification information associated to the status information "system configuration information".

FIG. 12A shows an example of a description of a Subject field of a request electronic mail. In this example, the Subject field of the request electronic mail is described as "devicestatus?request=sysconfig&format=text&lang=en", in which the Subject field refers to "requesting for system configuration information stored in the image forming apparatus in an English text format". That is, the description of the Subject field of the request electronic mail includes three status identification information "request=sysconfig", "format=text", and "lang=en". Each of the status identification information is configured as "argument name=parameter".

FIG. 12B shows an example of status information including arguments and parameters corresponding to the arguments. The parameters corresponding to the argument name "request" include, for example, "sysconfig", "netconfig", "prtconfig", "supply", and "status". Here, "sysconfig" refers to "system configuration information", "netconfig" refers to "network configuration information", "prt config" refers to "printer configuration", "supply" refers to "supply information", and "status" refers to "device status information". Furthermore, the parameters corresponding to the argument name "format" include, for example, "text", "html", and "xml". Here, "text" refers to "text data format", "html" refers to "html data format", and "xml" refers to "xml data format". Furthermore, the parameters corresponding to the argument name "lang" include, for example, "ja", "en", "fr", "de", "it", and "es". Here, "ja" refers to "Japanese text", "en" refers to "English text", "fr" refers to "French text", "de" refers to "German text", "it" refers to "Italian text", and "es" refers to "Spanish text".

Thus, the text "request=sysconfig" is defined as status identification information in correspondence with the status information "system configuration information" in the image forming apparatus information stored in the HDD of the image forming apparatus 1. Likewise, the text "request=netconfig" is defined as the status identification information in correspondence with the status information "network configuration information", and the text "format=text" is defined as the status identification information in correspondence with the status-information "format of text format" in the image forming apparatus information stored in the HDD of the image forming apparatus 1, respectively.

In a case where multiple status identification information is included in the Subject field of the request electronic mail, the CPU of the image forming apparatus 1 obtains corresponding status information from the image forming apparatus information stored in the HDD. The CPU of the image forming apparatus 1 forms the multiple status information as a single unit of data. For example, in the case of FIG. 12A, the CPU of the image forming apparatus 1 applies the data of the obtained "system configuration information" to an English data format, to thereby form a single unit of "text data".

Accordingly, the CPU of the image forming apparatus 1 determines whether status identification information is included in a predetermined area (e.g. Subject field) of the request electronic mail. Then, the CPU of the image forming apparatus 1 extracts status information corresponding to the status identification information of the request electronic mail from the image forming apparatus information stored in the HDD.

(6) Then, the CPU of the image forming apparatus 1 generates return electronic mail including the extracted image forming apparatus information (status information) according to the conditions of the extracted command data (Step S6).

For example, in a case where the command data in the first row of the command data table in FIG. 4 is extracted in Step S4, the condition of the command data (command data condition) is to "include the value of the Message-ID field obtained from the request electronic mail into the reference field of the return electronic mail". Here, in Step S6, the CPU of the image forming apparatus 1, in accordance with the command data condition, generates a return electronic mail having the value of the Message-ID field included into the Reference field thereof. The computer of the outside system, receiving the return electronic mail, can associate the return electronic mail to its corresponding transmitted request electronic mail. Accordingly, the computer of the outside system can easily manage multiple return electronic mails by associating the multiple return electronic mails with corresponding request electronic mails.

Likewise, in a case where the command data in the second row in the command data table of FIG. 4 is extracted in Step S4, the condition of the command data is to "set the mail address obtained from the Reply-To field of the request electronic mail as the destination mail address of the return electronic mail". Here, in Step S6, the CPU of the image forming apparatus 1, in accordance with the command data condition, generates a return electronic mail having the mail address in the Reply-To field of the request electronic mail as the destination mail address thereof. Accordingly, a return electronic mail having a destination mail address different from the original mail address of the request electronic mail can be generated.

Furthermore, in a case where the command data in the third row in the command data table of FIG. 4 is extracted in Step S4, the condition of the command data is to "set the original mail address obtained from the request electronic mail as the destination mail address of the return electronic mail". Here, in Step S6, the CPU of the image forming apparatus 1, in accordance with the command data condition, generates a return electronic mail having the original mail address of the request electronic mail as the destination mail address thereof. Accordingly, a return electronic mail having the original mail address of the request electronic mail as the destination mail address can be generated.

Furthermore, according to a command data table stored in the HDD, as shown in FIG. 8, the condition of the command data is to "set the original mail address obtained from the request electronic mail as the destination mail address of the return electronic mail". In this case, regardless of whether a return mail address is included in the Reply-To field of the request electronic mail, the CPU of the image forming apparatus 1 generates a return electronic mail having the original mail address obtained from the request electronic mail as the destination mail address thereof. Accordingly, the return electronic mail can be prevented from being transmitted to a mail address other than the original mail address of the request electronic mail.

(7) Next, the CPU of the image forming apparatus 1 transmits the generated return electronic mail via the modem (communication part) (Step S7). The transmitted electronic mail is relayed by the electronic mail server located in the communication network and is delivered to the destination mail address of the return electronic mail.

(8) Then, the CPU of the image forming apparatus 1 queries the inside mail server on whether there is any other unchecked electronic mail addressed to itself (addressed to its own mail address) (Step S8). In a case where the CPU of the image forming apparatus 1 receives information indicating that there is no unchecked mail addressed to the mail address of the image forming apparatus 1, the CPU of the image forming apparatus 1 waits until the next timing of the mail transmission/reception process (Step S9). In a case where there is unchecked electronic mail (request electronic mail) addressed to the mail address of the image forming apparatus 1, the CPU of the image forming apparatus 1 receives the request electronic mail (Step S2). Then, the CPU of the image forming apparatus 1 performs the Steps S3-S7.

Accordingly, the CPU of the image forming apparatus 1 according to the first embodiment of the present invention extracts command data corresponding to operation identification information obtained from a request electronic mail from the command data table stored in the HDD. Then, the CPU of the image forming apparatus 1 generates a return electronic mail in accordance with the condition(s) of the extracted command data. Accordingly, by transmitting a request electronic mail including a predetermined operation identification information to the mail address of the image forming apparatus 1, a desired return electronic mail can be received from the image forming apparatus 1.

Second Embodiment

Next, a second embodiment of the present invention is described. According to the second embodiment of the present invention, the CPU of the image forming apparatus 1, in addition to obtaining operation identification information, also obtains the original mail address of the request electronic mail in the above-described Step S3. Then, the CPU of the image forming apparatus 1 refers to the authorized domain reception list or the authorized mail address reception list stored in the HDD and determines whether there is a domain or mail address in the authorized domain reception list or the authorized mail address reception list that matches to the domain or the mail address of the request electronic mail. In a case where there is no matching domain or mail address, the CPU of the image forming apparatus 1 either does not generate a return electronic mail in the above-described Step S6 or does not transmit a return electronic mail in the above-described Step S7.

Other than the foregoing details described in the second embodiment of the present invention, the configuration and operation(s) of the second embodiment of the present invention are the same as those of the first embodiment of the present invention.

Accordingly, the image forming apparatus 1 according to the second embodiment of the present invention determines whether the request electronic mail is transmitted from one who has authorized access by comparing the domain or mail address indicated in the original mail address of the request electronic mail with those in the authorized domain reception list or the authorized mail address reception list. Therefore, even in a case where the mail address of the image forming apparatus 1 has leaked to an unauthorized third person/party, the image forming apparatus information of the image forming apparatus 1 cannot be obtained unless the domain or the mail address indicated in the original mail address of the request electronic mail is authentic.

Third Embodiment

Next, a third embodiment of the present invention is described. According to the third embodiment of the present invention, in generating the return electronic mail in the above-described Step S6, the CPU of the image forming apparatus 1 obtains a mail address from the request electronic mail, in which the mail address is to be the destination mail address for transmitting the return electronic mail. Then, the CPU of the image forming apparatus 1 refers to the authorized domain transmission list or the authorized mail address transmission list stored in the HDD and determines whether there is a domain or a mail address in the authorized domain transmission list or the authorized mail address transmission list that the domain or the mail address indicated in the obtained mail address. In a case where there is no matching domain or mail address, the CPU of the image forming apparatus 1 either does not generate a return electronic mail in the above-described Step S6 or does not transmit a return electronic mail in the above-described Step S7.

Other than the foregoing details described in the third embodiment of the present invention, the configuration and operation(s) of the third embodiment of the present invention are the same as those of the first embodiment of the present invention.

Accordingly, the image forming apparatus 1 according to the third embodiment of the present invention, in the step of generating the return electronic mail, determines whether the mail address for transmitting the return electronic mail is to be transmitted to one who has authorized access by comparing the domain or mail address indicated in the destination mail address of the request electronic mail with those in the authorized domain transmission list or the authorized mail address transmission list. Therefore, even in a case where the mail address of the image forming apparatus 1 has leaked to an unauthorized third person/party, the image forming apparatus information of the image forming apparatus 1 cannot be obtained unless the domain or the mail address indicated as the destination address for the return electronic mail is authentic.

Fourth Embodiment

Next, the fourth embodiment of the present invention is described. According to the fourth embodiment of the present invention, the command data table stored in the HDD includes data as shown in FIG. 9. In FIG. 9, the operation identification information of the command data table indicates whether a predetermined type of parameter in the request electronic mail is designated (i.e. whether there is a designation of a predetermined type of parameter). Furthermore, the command data in the command data table enables the CPU of the image forming apparatus 1 to extract default data corresponding to the predetermined type of parameter and generate a return electronic mail according to the extracted default data corresponding to the predetermined type of parameter.

(1) For example, in a case where the operation identification information obtained from the request electronic mail (in the above-described Step S3) indicates that there is no designation of the mail format, the CPU of the image forming apparatus 1 extracts the command data in the first row of the command data table in FIG. 9 in the above-described Step S4. The operation identification information "no designation of mail format" means that there is no data designating the mail format in a prescribed part of the request electronic mail. For example, in a case where information indicated as "format=text" is included in the Subject field of the request electronic mail, such information is a designation of data which means "set the mail format to a text format". Meanwhile, in a case where the Subject field of the request electronic mail includes a parameter but no corresponding data (e.g. "format=") or in a case where the Subject field of the request electronic mail includes neither a parameter nor corresponding data, the operation identification information means that there is "no designation of mail format". Accordingly, the CPU of the image forming apparatus 1 determines whether there is a designation of data (in this case, the mail format of the return electronic mail) by determining whether a parameter and corresponding data are included in a predetermined part of the request electronic mail. Thus, even when there is no data corresponding to the predetermined parameter in the request electronic mail, the image forming apparatus 1 can generate a return electronic mail according to predetermined default data.

Accordingly, in a case where the command data in the first row in the command data table of FIG. 9 is extracted, the CPU of the image forming apparatus 1 generates a return electronic mail according to the command data condition of the extracted command data. That is, in this example, the CPU of the image forming apparatus 1 extracts default data corresponding to the parameter "mail format" of the first row of the command data table from a default data table (See FIG. 5) stored in the HDD. Then, the CPU of the image forming apparatus 1 sets the extracted default data as the mail format of the return electronic mail. More specifically, the CPU of the image forming apparatus 1 generates a return electronic mail by including prescribed data along with the default data corresponding-to the first row "mail in text format".

(2) Likewise, in a case where the operation identification information obtained from the request electronic mail (in the above-described Step S3) indicates that there is no designation of the language of the main text of the return electronic mail, the CPU of the image forming apparatus 1 extracts the command data in the second row of the command data table in FIG. 9 in the above-described Step S4. For example, in a case where information indicated as "lang=ja" is included in the Subject field of the request electronic mail, such information is a designation of data which means "set the language of the main text of the electronic mail to Japanese". Meanwhile, in a case where the Subject field of the request electronic mail includes a parameter but no corresponding data (e.g. "lang=") or in a case where the Subject field of the request electronic mail includes neither a parameter nor corresponding data, the operation identification information means that there is "no designation of the language of the main text of the return electronic mail". Accordingly, the CPU of the image forming apparatus 1 determines whether there is a designation of data (in this case, the language of the main text of the return electronic mail) by determining whether a parameter and corresponding data are included in a predetermined part of the request electronic mail.

Accordingly, in a case where the command data in the second row in the command data table of FIG. 9 is extracted, the CPU of the image forming apparatus 1 generates a return electronic mail according to the command data condition of the extracted command data. That is, in this example, the CPU of the image forming apparatus 1 extracts default data corresponding to the parameter "language of main text of mail" of the second row of the command data table from a default data table (See FIG. 5) stored in the HDD. Then, the CPU of the image forming apparatus 1 sets the extracted default data as the language of the main text of the return electronic mail. More specifically, the CPU of the image forming apparatus 1 generates a return electronic mail by including prescribed data along with the default data corresponding to the second row "main text of mail in Japanese". The data of "main text of mail in Japanese" is template data of the main text in Japanese. The return electronic mail is generated by including image forming apparatus data in this template data.

(3) Likewise, in a case where the operation identification information obtained from the request electronic mail (in the above-described Step S3) indicates that there is no designation of a target status information (requested status information), the CPU of the image forming apparatus 1 extracts the command data in the third row of the command data table in FIG. 9 in the above-described Step S4. For example, in a case where information indicated as "request=sysconfig" is included in the Subject field of the request electronic mail, such information is a designation of data which means "the requested status information is system configuration information". Meanwhile, in a case where the Subject field of the request electronic mail includes a parameter but no corresponding data (e.g. "request=") or in a case where the Subject field of the request electronic mail includes neither a parameter nor corresponding data, the operation identification information means that there is "no designation of the target status information". Accordingly, the CPU of the image forming apparatus 1 determines whether there is a designation of data (in this case, the requested status information) by determining whether a parameter and corresponding data are included in a predetermined part of the request electronic mail.

Accordingly, in a case where the command data in the third row in the command data table of FIG. 9 is extracted, the CPU of the image forming apparatus 1 generates a return electronic mail according to the command data condition of the extracted command data. That is, in this example, the CPU of the image forming apparatus 1 extracts default data corresponding to the parameter "target status information" of the third row of the command data table from a default data table (See FIG. 5) stored in the HDD. Then, the CPU of the image forming apparatus 1 sets the extracted default data as the target status information. More specifically, the CPU of the image forming apparatus 1 extracts the status information corresponding to the status identification information from the image forming apparatus information stored in the HDD and generates a return electronic mail including the extracted status information.

Other than the foregoing details described in the fourth embodiment of the present invention, the configuration and operation(s) of the fourth embodiment of the present invention are the same as those of the first embodiment of the present invention.

According to the fourth embodiment of the present invention, even in a case where the kind of parameter is not designated in the request electronic mail (i.e. no designation of parameter in the predetermined part in the request electronic mail), the image forming apparatus 1 can identify a predetermined default data corresponding to the parameter by referring to the default data table. Accordingly, even where there is no designation of the parameter to be included in the return electronic mail, the image forming apparatus 1 can generate a return electronic mail according to the identified default data.

Fifth Embodiment (1) Next, a fifth embodiment of the present invention is described. According to the fifth embodiment of the present invention, the HDD of the image forming apparatus 1 is stored with a domain list and a mail address list of electronic mail addresses. The domain list is a list including multiple domains (i.e. part of an electronic mail address before the @ mark). The mail address list is a list including multiple mail addresses (i.e. user name@ domain name).

The manager of the image forming apparatus 1 stores and sets the domain list and the mail address list in the HDD of the image forming apparatus beforehand. The method (process) of storing the lists in the HDD and the manner of editing/deleting the lists are the same as those of the above-described command data table in the first embodiment of the present invention.

(2) Furthermore, the HDD of the image forming apparatus 1 according to the fifth embodiment of the present invention is stored with multiple default tables. Each of the default tables in the HDD are stored in a manner associated to the domains and mail addresses in the domain list and the mail address list. More specifically, the HDD of the image forming apparatus 1 is stored with the domain list and the mail address list in the manner shown in FIG. 10. In FIG. 10, the domains in the domain list and the mail addresses in the mail address list are associated to default data identification table ID serving to identify each of the default data tables. Each default data table is provided with a corresponding default data table ID.

(3) Furthermore, the CPU of the image forming apparatus 1, in addition to obtaining operation identification information, also obtains the original mail address of the request electronic mail in the above-described Step S3. Then, the CPU of the image forming apparatus 1 refers to the domain list or the mail address list stored in the HDD and determines whether there is a domain or mail address in the domain list or the mail address list that matches to the domain or the mail address of the obtained original mail address of the request electronic mail. Furthermore, the CPU of the image forming apparatus 1 also obtains a default data table ID corresponding to the domain or the mail address that matches with the domain or the mail address in the domain list or the mail address list. Then, the CPU of the image forming apparatus 1 identifies a default data table corresponding to the default data table ID and uses the default data table in the process of generating a return electronic mail in accordance with command data in the above-described Step S6.

Accordingly, default data can be set more specifically since a default data table corresponding to the domain or mail address indicated in the original mail address of the request electronic mail can be identified.

(4) As an alternative of using the original mail address of the request electronic mail, the mail address which is to be the destination mail address may be used in generating the return electronic mail in the above-described Step S6. In this case, the CPU of the image forming apparatus 1 obtains the mail address which is to be the destination mail address in generating the return electronic mail in the above-described Step S6. Then, the CPU of the image forming apparatus 1 determines whether there is a match between the domain or the mail address of the obtained mail address and one of the domains or the mail addresses in the domain list or the mail address list stored in the HDD. Furthermore, the CPU of the image forming apparatus 1 also obtains a default data table ID corresponding to the domain or the mail address that matches with the domain or the mail address in the domain list or the mail address list. Then, the CPU of the image forming apparatus 1 identifies a default data table corresponding to the default data table ID and uses the default data table in the process of generating a return electronic mail in accordance with command data in the above-described Step S6.

Accordingly, a default data table corresponding to the domain or mail address indicated in the mail address which is to be the destination mail address in generating the return electronic mail can be identified. Therefore, the default data can be set more specifically in correspondence with the domain or the mail address of the destination mail address of the return electronic mail.

Other than the foregoing details described in the fifth embodiment of the present invention, the configuration and operation(s) of the fifth embodiment of the present invention are the same as those of the first embodiment of the present invention.

According to the fifth embodiment of the present invention, the image forming apparatus 1 can identify a corresponding default data table by using the original mail address of the request electronic mail or the destination mail address of the return electronic mail. Therefore, the default data can be set more specifically in correspondence with the domain or the mail address indicated in the original mail address of the request electronic mail or the destination mail address of the return electronic mail.

Sixth Embodiment

Next, a sixth embodiment of the present invention is described. According to the sixth embodiment of the present invention, the HDD of the image forming apparatus 1 is stored with a domain list and a mail address list of electronic mail addresses. The domain list is a list including multiple domains (i.e. part of an electronic mail address before the @ mark). The mail address list is a list including multiple mail addresses (i.e. user name@ domain name).

The manager of the image forming apparatus 1 stores and sets the domain list and the mail address list in the HDD of the image forming apparatus beforehand. The method (process) of storing the lists in the HDD and the manner of editing/deleting the lists are the same as those of the above-described command data table in the first embodiment of the present invention.

Furthermore, according to the sixth embodiment of the present invention, the status information in the image forming apparatus information is stored in the HDD in a manner associated to the domains in the domain list or the mail addresses in the mail address list. More specifically, the HDD of the image forming apparatus 1 is stored with the domain list and the mail address list in a manner shown in FIG. 11. In FIG. 11, the domains in the domain list and the mail addresses in the mail address list are associated to status identification information serving to identify the status information. The image forming apparatus information stored in the HDD has a data structure as shown in FIG. 6. Accordingly, the status identification information serves to associate the status information in the image forming apparatus information with respect to the domains in the domain list or the mail addresses in the mail address list.

Then, the CPU of the image forming apparatus 1 obtains the original mail address of the request electronic mail in the above-described Step S3. Then, the CPU of the image forming apparatus 1 refers to the domain list or the mail address list stored in the HDD and determines whether there is a domain or mail address in the domain list or the mail address list that matches to the domain or the mail address of the obtained original mail address of the request electronic mail. Furthermore, the CPU of the image forming apparatus 1 also obtains a status identification information corresponding to the domain or the mail address that matches with the domain or the mail address in the domain list or the mail address list. Then, the CPU of the image forming apparatus 1 extracts the status information corresponding to the obtained status identification information from the image forming apparatus information in the HDD in the above-described Step S5. Furthermore, the CPU of the image forming apparatus 1 includes the extracted status information as the image forming apparatus information in the process of generating a return electronic mail in the above-described Step S6.

As an alternative of using the original mail address of the request electronic mail, the mail address which is to be the destination mail address may be used in generating the return electronic mail in the above-described Step S6. In this case, the CPU of the image forming apparatus 1 obtains the mail address which is to be the destination mail address in generating the return electronic mail in the above-described Step S6. Then, the CPU of the image forming apparatus 1 determines whether there is a match between the domain or the mail address of the obtained mail address and one of the domains or the mail addresses in the domain list or the mail address list stored in the HDD. Furthermore, the CPU of the image forming apparatus 1 also obtains a status identification information corresponding to the domain or the mail address that matches with the domain or the mail address in the domain list or the mail address list. Then, the CPU of the image forming apparatus 1 extracts the status information corresponding to the obtained status identification information from the image forming apparatus information in the HDD. Furthermore, the CPU of the image forming apparatus 1 includes the extracted status information as the image forming apparatus information in the process of generating a return electronic mail in the above-described Step S6.

Other than the foregoing details described in the sixth embodiment of the present invention, the configuration and operation(s) of the sixth embodiment of the present invention are the same as those of the first embodiment of the present invention.

According to the sixth embodiment of the present invention, the image forming apparatus 1 can identify corresponding status information by using the original mail address of the request electronic mail or the destination mail address of the return electronic mail. Thus, the status information can included as image forming apparatus information in the return electronic mail. Accordingly, the authority to obtain status information can be set in according with the domain or the mail address indicated in the original mail address of the request electronic mail or the destination mail address of the return electronic mail.

Accordingly, with the image forming apparatus according to one of the above-described embodiments of the present invention, a management computer located at a remote area (outside system) can obtain image forming apparatus information even in a case where the image forming apparatus is situated in an inside network (e.g. LAN) having a firewall controlling or prohibiting communication according to HTTP protocol (HTTP communication).

Accordingly, with the image forming apparatus according to one of the above-described embodiments of the present invention, a management computer situated at a remote area can easily determine which return electronic mail corresponds to which request electronic mail since the image forming apparatus includes a Message-ID field value of the request electronic mail in the References field of the return electronic mail.

Accordingly, with the image forming apparatus according to one of the above-described embodiments of the present invention, the image forming apparatus can transmit the return electronic mail to a desired mail address regardless of whether the desired mail address is the same as the return mail address of the request electronic mail or is different from the return mail address of the request electronic mail.

Accordingly, with the image forming apparatus according to one of the above-described embodiments of the present invention, unauthorized access such as spoofing can be prevented by verifying the original mail address of the request electronic mail (e.g. a case where an authorized mail address is included in the From field of the request electronic mail while an unauthorized mail address is included in the Reply-To field of the request electronic mail.

Accordingly, with the image forming apparatus according to one of the above-described embodiments of the present invention, even in a case where the mail address of the image forming apparatus has leaked, the image forming apparatus can prevent unauthorized access by referring to the original mail address of the request electronic mail or by referring to the return mail address (which is to be the destination mail address of the return electronic mail). Accordingly, image forming apparatus information can be prevented from leaking. Furthermore, authorization may be granted to large number of mail addresses belonging to a particular domain name by referring to the domain list (authorized domain reception list, authorized domain transmission list).

Accordingly, with the image forming apparatus according to one of the above-described embodiments of the present invention, even in a case where there is no designation of a predetermined parameter of the return electronic mail in the request electronic mail, the image forming apparatus can generate a return electronic mail including default data corresponding to the predetermined parameter.

Accordingly, with the image forming apparatus according to one of the above-described embodiments of the present invention, specific default data can be used in generating the return electronic mail by using a default data table corresponding to a domain or a mail address indicated in the original mail address of the request electronic mail or a default data table corresponding to a domain or a mail address of a mail address which is to be the destination mail address of the return electronic mail.

Further, the present invention is not limited to these embodiments, but variations and modifications may be made without departing from the scope of the present invention.

The present application is based on Japanese Priority Application No. 2004-256640 filed on Sep. 3, 2004, with the Japanese Patent Office, the entire contents of which are hereby incorporated by reference.

What is claimed is:

1. An image forming apparatus communicating with an outside system via a communication part for providing image forming apparatus information to the outside system in response to a request electronic mail transmitted from the outside system, the image forming apparatus comprising:
   a memory part including the image forming apparatus information and a command data table indicating command data in correspondence with operation identification information; and
   a processing part configured to
      obtain the operation identification information included in the request electronic mail from the outside system requesting the image forming apparatus information,
      extract the command data corresponding to the obtained operation identification information from the command data table in the memory part,
      extract the image forming apparatus information in the memory part,
      generate a return electronic mail including the extracted image forming apparatus information in accordance with the extracted command data, and
      transmit the generated return electronic mail to the outside system via the communication part.

2. The image forming apparatus as claimed in claim 1, wherein the operation identification information in the request electronic mail includes Message-ID field information indicating that a value is included in a Message-ID field of the request electronic mail, wherein the command data includes Message-ID field data corresponding to the Message-ID field information for commanding the process part to include the value in the Message-ID field in a References field of the return electronic mail when generating the return electronic mail.

3. The image forming apparatus as claimed in claim 1, wherein the operation identification information in the request electronic mail includes return mail address information indicating that a return mail address is included in a Reply-To field of the request electronic mail, wherein the command data includes return mail address data corresponding to the return mail address information for commanding the process part to set the return mail address in the Reply-To field as a destination mail address of the return electronic mail when generating the return electronic mail.

4. The image forming apparatus as claimed in claim 3, wherein the operation identification information in the request electronic mail includes another return mail address information indicating that no return mail address is included in the Reply-To field of the request electronic mail, wherein the command data includes another return mail address data corresponding to the other return mail address information for commanding the process part to set an original mail address of the request electronic mail as the destination mail address of the return electronic mail when generating the return electronic mail.

5. The image forming apparatus as claimed in claim 1, wherein the processing part is configured to set the original mail address of the request electronic mail as a destination mail address of the return electronic mail when generating the return electronic mail.

6. The image forming apparatus as claimed in claim 1, wherein the memory part further includes an authorized domain reception list or an authorized mail address reception list, wherein the processing part is configured to determine whether there is a domain or a mail address in the authorized domain reception list or the authorized mail address list that matches with a domain or a mail address indicated in the original mail address of the request electronic mail, wherein the processing part is configured to refrain from generating or transmitting the return electronic mail when there is no domain or mail address in the authorized domain reception list or the authorized mail address reception list that matches with the domain or the mail address indicated in the original mail address of the request electronic mail.

7. The image forming apparatus as claimed in claim 1, wherein the memory part further includes an authorized domain transmission list or an authorized mail address transmission list, wherein the processing part is configured to determine whether there is a domain or a mail address in the authorized domain transmission list or the authorized mail address transmission list that matches with a domain or a mail address indicated in a mail address which is to be the destination mail address of the return electronic mail, wherein the processing part is configured to refrain from generating or transmitting the return electronic mail when there is no domain or mail address in the authorized domain transmission list or the authorized mail address transmission list that matches with the domain or the mail address indicated in the mail address which is to be the destination mail address of the return electronic mail.

8. The image forming apparatus as claimed in claim 1, wherein the memory part further includes one or more default data tables, wherein each default data table indicates default data in correspondence with various kinds of parameters of electronic mail, wherein the operation identification information in the request electronic mail includes parameter information indicating that the request electronic mail includes no designation of a predetermined parameter of the return electronic mail, wherein the command data includes data corresponding to the parameter information for commanding the process part to extract a predetermined default data corresponding to the predetermined parameter from the default data table and include the extracted predetermined default data in the return electronic mail when generating the return electronic mail.

9. The image forming apparatus as claimed in claim 8, wherein the memory part further includes a domain list or a mail address list, wherein each default data table corresponds to a domain in the domain list or a mail address in the mail address list, wherein the processing part is configured to determine whether there is a domain or a mail address in the domain list or the mail address list that matches with a domain or a mail address indicated in the original mail address of the request electronic mail, wherein the processing part is configured to extract default data from the default data table corresponding to a matching domain or a matching mail address and include the default data in the return electronic mail when generating the return electronic mail.

10. The image forming apparatus as claimed in claim 8, wherein the memory part further includes a domain list or a mail address list, wherein each default data table corresponds to a domain in the domain list or a mail address in the mail address list, wherein the processing part is configured to determine whether there is a domain or a mail address in the domain list or the mail address list that matches with a domain or a mail address indicated in the mail address which is to be the destination mail address of the return electronic mail, wherein the processing part is configured to extract default data from the default data table corresponding to a matching domain or a matching mail address and include the default data in the return electronic mail when generating the return electronic mail.

11. An image forming apparatus communicating with an outside system via a communication part for providing image forming apparatus information to the outside system in response to a request electronic mail transmitted from the outside system, the image forming apparatus comprising:
   storage means for storing the image forming apparatus information and a command data table indicating command data in correspondence with operation identification information;
   means for obtaining the operation identification information included in the request electronic mail from the outside system requesting the image forming apparatus information;
   means for extracting the command data corresponding to the obtained operation identification information from the command data table in the storage means;
   means for extracting the image forming apparatus information in the storage means;
   means for generating a return electronic mail including the extracted image forming apparatus information in accordance with the extracted command data; and
   means for transmitting the generated return electronic mail to the outside system via the communication part.

* * * * *